United States Patent [19]
Kupcikevicius et al.

[11] Patent Number: 5,149,943
[45] Date of Patent: Sep. 22, 1992

[54] HEAT SEALING MEMBER FOR MAKING CONTOURED HEAT SEALS

[75] Inventors: Vytautas Kupcikevicius, Oaklawn; Philip F. Cilia, Palos Hills; Darrell L. Burkeen, Lansing, all of Ill.

[73] Assignee: Viskase Corporation, Chicago, Ill.

[21] Appl. No.: 818,307

[22] Filed: Jan. 8, 1992

[51] Int. Cl.⁵ .................. B32B 31/18; H05B 1/00
[52] U.S. Cl. .................. 219/243; 219/542; 156/583.2; 338/316
[58] Field of Search ............... 219/243, 221, 227, 233, 219/235, 542, 536-537; 156/583.1-583.4, 515, 498; 83/170-171; 338/316, 315, 273-274, 252

[56] References Cited

U.S. PATENT DOCUMENTS

| | | |
|---|---|---|
| 2,904,100 | 9/1959 | Fener . |
| 3,015,601 | 1/1962 | Fener . |
| 3,166,459 | 1/1965 | Imhof ........................ 156/583.2 |
| 3,334,005 | 8/1967 | Fener ........................ 156/583.2 |
| 3,496,049 | 2/1970 | Anderson .................. 156/583.2 |
| 3,620,884 | 11/1971 | Peterson .................... 156/515 |
| 3,624,349 | 11/1971 | Mayer ....................... 156/515 |
| 3,916,148 | 10/1975 | La Fleur ..................... 219/243 |
| 3,948,720 | 4/1976 | Reil .......................... 156/583.4 |
| 3,982,991 | 9/1976 | Hamm et al. ............... 219/243 |

FOREIGN PATENT DOCUMENTS

| | | |
|---|---|---|
| 2535139 | 2/1977 | Fed. Rep. of Germany ... 156/583.1 |
| 997157 | 7/1965 | United Kingdom .......... 219/243 |
| 1035031 | 7/1966 | United Kingdom . |
| 1200347 | 7/1970 | United Kingdom . |

OTHER PUBLICATIONS

Service Manual for the Vertrod Thermal Impulse Heat Sealer, Vertrod Corp. 2037 Utica Ave., Brooklyn, NY 11234, Feb. 1973.

Primary Examiner—Bruce A. Reynolds
Assistant Examiner—John A. Jeffery
Attorney, Agent, or Firm—Roger Aceto

[57] ABSTRACT

The heat sealing wire of an impulse heat sealer is held against an operating face of a support bar by an insulating fabric which is draped over the wire and secured in a slot formed in the support bar. The securing drape of fabric allows unrestricted expansion and contraction of the hot wire. Also if the slot lies in a curved plane which extends perpendicular to the plane of the support bar operating face, the drape of insulating fabric and consequently the sealing wire follow the same curve so the heat sealer can make seals of a non-linear configuration.

20 Claims, 2 Drawing Sheets

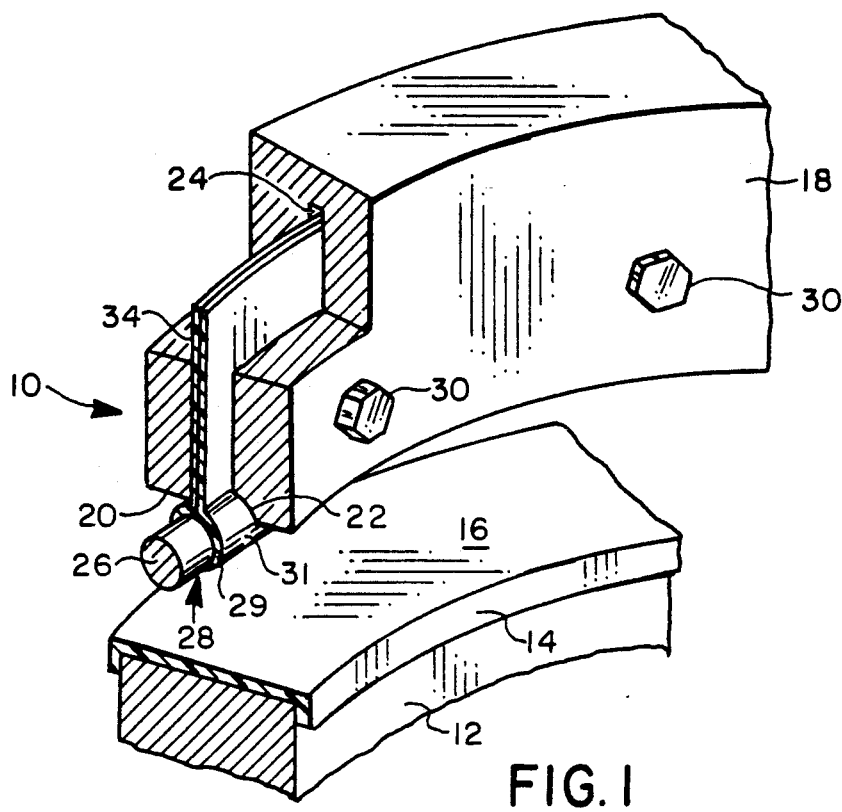
FIG. 1
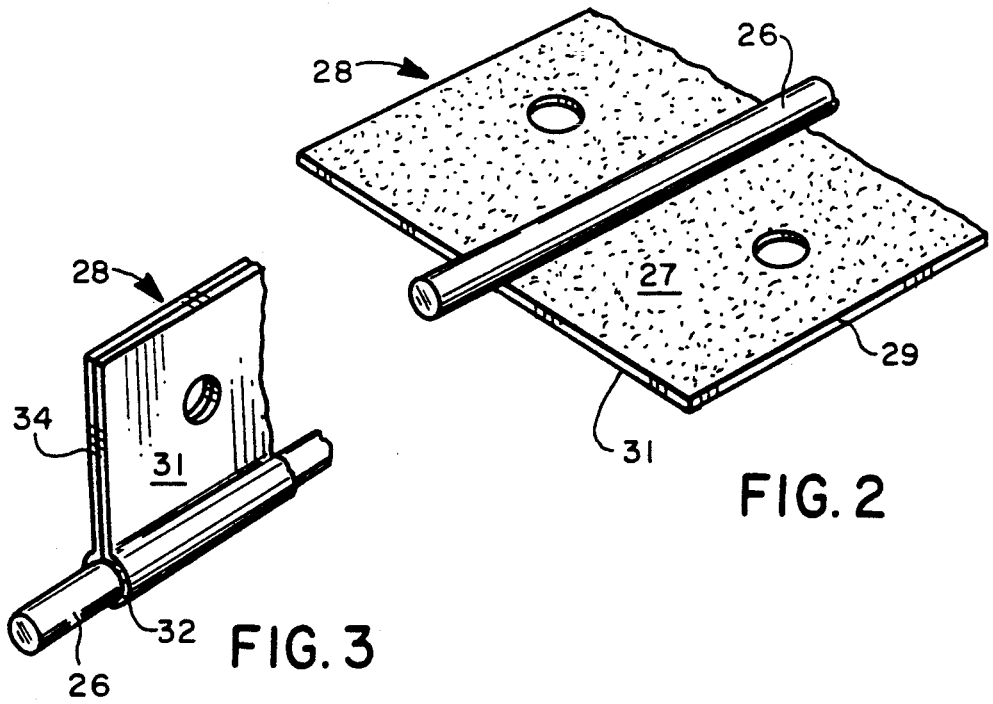
FIG. 2
FIG. 3

HEAT SEALING MEMBER FOR MAKING CONTOURED HEAT SEALS

TECHNICAL FIELD

The present invention relates to an impulse heat sealer and in particular to an impulse heat sealer for making contoured or non-linear heat seals.

BACKGROUND OF THE INVENTION

Impulse heat sealing apparatus for heat sealing thermoplastic materials such as plastic bags are known in the art. The heat sealer, referred to as an impulse sealer, uses an electrically conductive high resistance wire heated generally by a short burst of electrical current. While heated, the wire is pressed against or through the materials to be sealed.

High resistance wire is relatively flexible so it can be used for making either linear or non-linear heat seals. In the context of the present invention, "non-linear" is understood to mean a seal or seam which is curved or has a contour or shape other than straight across the flat width of the bag.

Various arrangements are available for mounting and supporting the resistance wire in operation. For example, in one typical arrangement the wire is held in tension by spring biased members attached only to the ends of the wire. This keeps the wire straight and the spring bias serves to accommodate the elongation and contraction of the resistance wire during its heat up and cool down cycles. Since the wire is held in tension, this arrangement is limited to making straight seals and sealing is accomplished by passing the wire completely through one or more plies of thermoplastic materials.

In another arrangement, the wire is rested on one face of an elongated support bar usually a metal bar which functions both as a support for the wire and as a heat sink. With this arrangement the wire must be insulated from the bar and is pressed against, but not necessarily through, the materials to be heat sealed. Either straight or non-linear seals can be made with this arrangement. However, for non-linear seals, the wire must be bent to the desired seal configuration and then anchored along its length to the support bar to maintain the desired shape. For example, in one arrangement the resistance wire is laid in the desired shape onto a support bar and secured in place with an adhesive tape. The adhesive tape conventionally used is one having a backing composed of an insulating fabric such as a fabric woven from glass fibers and impregnated or coated with tetrafluoroethylene (TFE). This electrically insulates the wire and prevents the heated wire from sticking to the heat sealed plastic. To insure that essentially the same shape of seal is made when either the tape or wire is replaced, the support bar may have a groove of the desired seal shape for receiving a wire laid into this groove.

Anchoring the wire with an adhesive tape, with or without the added support of a groove in the support bar, requires some skill. Allowance must be made to accommodate the expansion and contraction of the wire yet it must be so secured that it maintains the desired configuration even after repeated cycles of expansion and contraction. Movement of the wire from the desired shape of seal configuration often is not detected until after a seal is made. When this occurs, the heat sealing operation must stop while the adhesive tape is removed and the wire is realigned or replaced and then is retaped into position.

Another anchoring scheme is disclosed in U.S. Pat. No. 3,334,005. Here, spikes are welded to the sealing wire at spaced intervals along the length of the wire. The spikes are then anchored in holes drilled into the support bar. While this insures the wire is fixed in the desired seal shape, the spikes provide heat sinks which interfere with the uniform heating of the wire so there may be cold spots at intervals along the wire. To insure proper heat sealing with such an arrangement some accommodation must be made to compensate for these cold spots. For example, the '005 Patent discloses use of separate heating elements to heat the spikes and prevent such cold spots along the wire.

The present invention provides means for mounting a flexible heat sealing element to produce curved or other non-linear heat seals. The mounting means of the present invention holds the heat sealing element in the desired shape or contour and all non-linear seals are maintained to the desired contour regardless of the number of seals made. Moreover, in the present invention, the flexible heat sealing element is free to expand and contract longitudinally over its entire length without altering the seal contour. Also, the mounting means of the present invention makes it possible to remove and replace flexible heat sealing elements quickly and easily. No special skills are required to insure that the replacement heat sealing element makes the same shape non-linear seal as the one replaced.

Accordingly, one object of the present invention is to provide an impulse heat sealer for making either linear or non-linear heat seals.

Another object of the present invention is to provide a heat sealer for making either linear or non-linear heat seals which allows an electrically heated sealing element to freely expand or contract without altering the shape of the heat seal.

A further object of the present invention is to provide an impulse heat sealer for making non-linear heat seals wherein changing a flexible heat sealing element is accomplished with a minimum of effort and skill and without altering the shape of the heat seal.

SUMMARY OF THE INVENTION

In one aspect, the present invention is a heat sealer comprising:

a) a seal bar having a substantially flat longitudinally extending face and a slot in said seal bar opening through said face for the full length of said seal bar;

b) a flexible electrically heated sealing wire on said face and extending along said slot opening for at least the full length of said slot;

c) a heat resistant fabric longitudinally folded onto itself and draped around said sealing wire to provide a single ply encircling said wire for at least the length of said bar and a double ply portion extending radially from said heat sealing wire;

d) said double ply portion being received into said slot and the combined width of said wire and encircling fabric being greater than the width of said slot such that said wire is not received into said slot; and e) securing means for fixing said double ply portion within said slot whereby said fabric anchors said wire to said seal bar.

In another, aspect, the present invention is a method for assembling a heat sealer comprising the steps of:

a) forming a seal bar with a slot extending inward from a face of the seal bar, the slot extending the full length of the seal bar;

b) draping a heat resistant fabric around an electrically heated sealing wire such that a single ply portion of the fabric envelopes the wire and a double ply portion of the fabric extends outwardly from the wire;

c) inserting the double ply portion of fabric into the slot so as to draw the heat sealing wire against the seal bar face; and d) securing the double ply portion of fabric in the slot for anchoring the sealing wire at the seal bar face.

DESCRIPTION OF THE DRAWINGS

FIG. 1 is a perspective view on an enlarged scale partly broken away and in section showing an impulse heat sealer according to the present invention;

FIGS. 2 and 3 are perspective views on a reduced scale showing an impulse heating element according to the present invention at different stages of assembly;

DETAILED DESCRIPTION OF THE INVENTION

Figure 4:
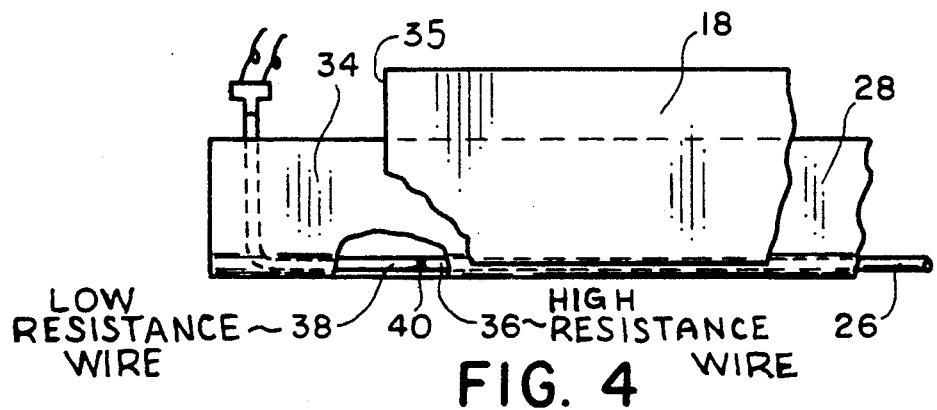
FIG. 4 is an elevation view on a reduced scale showing a seal bar as may be used in an impulse heat sealer according to the present invention.

Referring to the drawings, FIG. 1 shows a portion of an impulse heat sealer generally indicated at 10. It should be appreciated that certain parts are shown out of proportion for purposes of clarity. The heat sealer has an anvil, i.e. lower bar, 12. The anvil can be of any rigid material but a preferred material is one having a high thermal conductivity, such as copper or aluminum. A cushioning layer 14, such as a silicon rubber mat is secured to and forms the operating face 16 of the anvil.

The anvil operates in cooperation with a seal bar 18 to effect the heat sealing of a plastic film (not shown). The seal bar carries a heating element 26 on the face 20 of the bar disposed towards the anvil. To make a seal, layers of plastic film are laid across the operating face 16 of the anvil. The seal bar and anvil are then moved together and pressed against the film. It should be appreciated that pressing on the film can be accomplished by moving either or both the anvil and seal bar one towards the other. A combination of the heat generated by heating element 26 and the pressure exerted by the support bar and anvil heat seals the layers of plastic film together.

As shown in FIG. 1, seal bar 18 has its face 20 disposed towards the operating face 16 of the anvil. For purposes of orientation, the operating face 16 of the anvil and the face 20 of the seal bar will be considered as being parallel to the plane of the seal which is made when the anvil and seal bar are closed one against the other.

Face 20 of the seal bar has a seat 22 which extends along the face. Extending into the bar from this seat is a narrow slot 24. Both the seat 22 and the slot 24 extend along a non-linear path for the full length of the bar, i.e. they both lie in a curved plane which extends perpendicular to the plane of the seal bar face 20.

Heating element 26 is located at the seal bar face 20 and is disposed in seat 22. Preferably, the heating element 26 is a sealing wire of a high electrical resistance material such as a nickel-chromium alloy sold under the name "Nichrome". The wire, while shown to be round in cross-section, can be rectangular or other appropriate shape so as to fit into a seat 22 of matching shape. Nichrome wires of this type conventionally are used in impulse heat sealers.

The heating element 26, hereinafter referred to as a sealing wire, is wrapped in an adhesive tape generally indicated at 28. The tape has a heat resistant, fabric backing 29 with a non-stick outer surface 31. In the event that seal bar 18 is made of a conductive material, the tape 28 should be of an electrical insulating material to prevent electrical contact between the sealing wire and seal bar. A conventional backing having both heat and electrical insulating properties is a fabric woven from glass fibers and either impregnated or coated with TFE. Such a fabric conventionally is used with impulse heat sealers both to electrically insulate the sealing wire from a metallic support, i.e. seal bar 18, and to provide the sealing wire with antistick properties to facilitate the separation of the sealing wire from the plastic film after heat sealing. For purposes of illustration, the thickness of the tape 28 relative to the diameter of the seal wire 26 has been exaggerated. However, it should be noted that the width of the sealing wire 26 is greater than the width of slot 24 so the wire itself cannot enter into the slot.

The tape 28 which is wrapped around the sealing wire 26 extends into slot 24 and is secured in the slot by any suitable means such as bolts 30. Since both the seat 22 and slot 24 are curved in a plane perpendicular to the seal bar face 20, the securing of the tape 28 to the seal bar 18 in this fashion orients the sealing wire for making a curved heat seal.

FIGS. 2 and 3 illustrate steps in a sequence of assembling the sealing bar. In this respect, the sealing wire 26 is laid onto the adhesive side 27 of tape 28. The tape then is folded onto itself so the tape adheres to itself and the fabric backing 29 of the tape drapes around the sealing wire. The result as shown in FIG. 3 is that the tape 28 with its fabric backing forms a single ply portion 32 enveloping the sealing wire 26 and a double ply portion 34 extending radially from the wire.

This double ply portion is inserted into the curved seal bar slot 24 (FIG. 1). Since the width of the sealing wire and encircling single ply 32 is greater than the width of slot 24, the double ply portion 34 can be inserted and drawn into the slot to firmly nest the sealing wire 26 in seat 22. Since the slot 24 is curved, the sealing wire 26 within the tape also assumes a curved configuration matching the curve of the slot 24 and seat 22. Bolts 30 then are inserted through the seal bar and the double ply portion 34 to retain the tape and therefore the sealing wire fixed to the seal bar.

Thus, the tape, which has its fabric backing disposed around the sealing wire and fixed in slot 24 as shown, serves several purposes. It anchors the sealing wire to the seal bar in a curved configuration and yet allows the unrestricted longitudinal expansion and contraction of the wire during the heating and cooling cycles of impulse heat sealing. In this respect, the wire is free to slide relative to the tape within the envelope of the single ply portion 32 so the expansion and contraction of the wire when heated and cooled is readily accommodated. The tape, of course, remains at a position fixed by bolts 30 and the configuration of slot 24. Also, if the sealing bar is metal, the fabric backing preferably is an insulating material for electrically insulating the sealing wire from the seal bar.

Should either the sealing wire 26 or tape 28 require replacement, the bolts 30 are removed and the sealing wire 26 with its protective enwrapment is pulled from slot 24. A new wire is wrapped with tape as described hereinabove and then is bent to the desired curvature. The double ply portion 34 of the tape then is inserted into slot 24 and fixed in place all as described hereinabove. No special skills are required to provide the sealing wire with an insulating covering nor are special skills required to insure that the new sealing wire assumes the same curved shape as the wire replaced. The curvature of the slot 24 and seat 22 insure that each replacement sealing wire is held at the same configuration.

FIG. 4 shows an end 35 of a seal bar 18 to illustrate that the sealing wire 26 extends out the side of the seal bar for electrical connection to a source of electrical energy (not shown). The adhesive tape 28 with its backing of insulating fabric also extends from the end of the seal bar to insure the sealing wire is electrically insulated over its length from the seal bar 18.

During the heating cycle it was found that the portion of the Nichrome sealing wire which was nested in seat 22 had different heating characteristics than the portion of the wire which extended from the ends 35 of the seal bar 18. This is because the seal bar functions as a heat sink for the portion of the sealing wire in contract with the bar. As a result, the end portions of the sealing wire heat and expand more than the portion in contact with the seal bar.

To eliminate the excessive heating and expansion at the ends of the sealing wire, FIG. 4 shows an embodiment wherein the sealing wire 26 has two components. The first component is a section 36 comprising a high resistance Nichrome wire. This section 36 is slightly shorter than the length of the seal bar. The second component is a section 38 of a low resistance material, welded or otherwise attached at 40 to the ends of the Nichrome wire. The electrical connection is made to this low resistance section. With this arrangement, there is less heating and expansion of the ends of the sealing wire not in contact with the seal bar. Accordingly, by attaching a low resistance extension to the high resistance Nichrome sealing wire, excessive heating at the exposed ends of the wire is avoided which eliminates the need for expandable hot wire mounting hardware.

Figure 5:
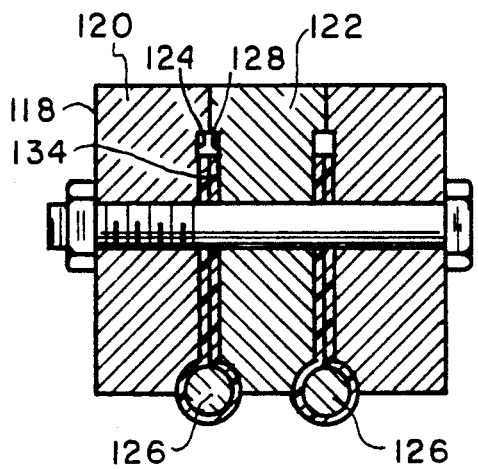
FIG. 5 is a cross-sectional view showing another embodiment of the present invention.

FIG. 5 shows an embodiment wherein the seal bar 118 supports two sealing wires 126. FIG. 5 also illustrates an alternative to having a slot formed in the sealing bar as shown in FIG. 1. In the FIG. 5 embodiment, the the seal bar 118 is composed of two or more sections 120, 122 which are bolted together. The adjacent faces 124, 128 of these sections are recessed so when the sections are bolted together, they capture between them the double ply portion 134 of the adhesive tape.

In some heat sealing applications, it is preferred to provide cooling means for the heat sealing wire and the seal bar. This commonly is done by directing a stream of air at the sealing bar, by providing the seal bar with a cooling jacket or by extending conduits through the seal bar for the circulation of a coolant.

Figure 6:
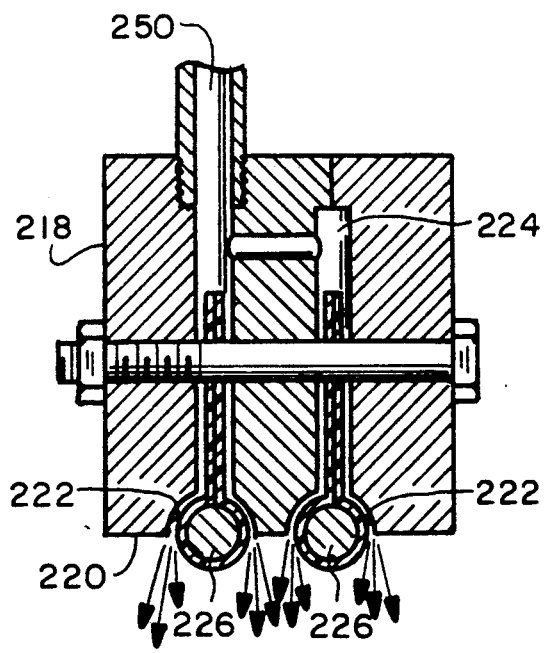
FIG. 6 is a view similar to FIG. 5 only showing still another embodiment of the invention.

The embodiment shown in FIG. 6 includes an arrangement for cooling the sealing wire. As shown in FIG. 6, the slot 224 in which the double ply portion of tape is anchored, also serves as a conduit for directing cooling air against the sealing wire. For this purpose, the seal bar 218 has an air inlet 250 communicating with the slot 224. Cooling air, from a source not shown is forced into the inlet 250 so it passes down through slot 224. The air exits into seat 222 and then flows around the sealing wire 226 and away from the face 220 of the seal bar. In this fashion, the cooling air directs the sealing wire generated heat away from the sealing bar.

While the invention has been described in connection with an arrangement for making a curved heat seal, it should be appreciated that the present invention can be employed for making a seal of any other non-linear, configuration or even a straight seal.

Having thus described the invention in detail, what is claimed as new is:

1. A heat sealer comprising:
   a) a seal bar having a substantially flat longitudinlly extending face and a slot in said seal bar opening through said face for the full length of said seal bar;
   b) a flexible electrically heated sealing wire on said face and extending along said slot opening for at least the full length of said slot;
   c) a heat resistant fabric longitudinally folded onto itself and draped around said heat sealing wire to provide a single ply encircling said wire for at least the length of said seal bar and a double ply portion extending radially from said heat sealing wire;
   d) said double ply portion being received into said slot and the combined width of said wire and encircling fabric being greater than the width of said slot such that said wire is not received into said slot; and
   e) securing means for fixing said double ply portion within said slot whereby said fabric anchors said wire to said seal bar.

2. A heat sealer as in claim 1 wherein the opening of said slot through said seal bar face is non-linear along the plane of said face and said flexible heat sealing wire follows the non-linear shape of said slot opening.

3. A heat sealer as in claim 1 wherein said fabric is composed of an electrically insulating material.

4. A heat sealer as in claim 1 wherein said fabric is an adhesive tape having a backing composed of woven glass fibers impregnated with tetrafluoroethylene.

5. A heat sealer as in claim 1 including a groove in said seal bar face forming a seat for receiving said heat sealing wire and said slot extending into said seal bar from said groove.

6. A heat sealer as in claim 1 wherein said seal bar is a heat sink.

7. A heat sealer as in claim 1 wherein said securing means extends transverse said slot and through said fabric for anchoring said double ply thickness portion in said slot.

8. A heat sealer as in claim 1 wherein said electrically heated sealing wire is a high resistance impulse type sealing wire, and said fabric is composed of an electrically insulating material.

9. A heat sealer as in claim 1 wherein:
   a) said seal bar is metal and has a groove along said face which forms a seat for receiving said heat sealing wire, said groove being non-linear along its length and said slot extending into said seal bar from said groove; and
   b) said heat resistant fabric secured in said slot is composed of an electrically insulating material and comprises means both to anchor said flexible sealing wire in said groove and to insulate said wire from said seal bar.

10. A heat sealer as in claim 1 wherein said seal bar is adapted to make at least two parallel heat seals and has at least a pair of said slots, each opening through said face, and a seal wire-enveloping-fabric secured in each slot.

11. A heat sealer as in claim 1 wherein said seal bar comprises at least two sections securable together and said slot being formed at the interface of said secured together sections.

12. A heat sealer as in claim 1 wherein said heat sealing wire is an electrical impulse type and includes:
  a) a first portion of a high resistance metal, the length of said first portion being shorter than the length of said seal bar; and
  b) a second portion welded to each end of said first portion, each of said second portions extending beyond the ends of said seal bar and each being of a low resistance material.

13. A heat sealer as in claim 1 including air inlet means extending through said seal bar and communicating with said slot at a location remote from said seal bar face, and said slot comprising means for directing air against said sealing wire.

14. A method of assembling a heat sealer comprising the steps of:
  a) forming a seal bar with a slot extending inward from a face of the seal bar, the slot extending the full length of the seal bar;
  b) draping a heat resistant fabric around an electrically heated sealing wire such that a single ply portion of the fabric envelopes the wire and a double ply portion of the fabric extends outwardly from the wire;
  c) inserting the double ply portion of fabric into the slot so as to draw the heat sealing wire against the seal bar face; and
  d) securing the double ply portion of fabric in the slot for anchoring the sealing wire at the operating face.

15. A method as in claim 14 wherein forming the slot provides an opening of the slot through the seal bar face which is non-linear over the length of the seal bar, and the sealing wire drawn against the face follows along the non-linear slot opening.

16. A method as in claim 14 wherein said sealing wire is a high resistance electrically heated impulse-type sealing wire and said fabric is composed of an electrically insulating material.

17. A method as in claim 14 wherein said fabric has an adhesive surface and draping the fabric around the sealing wire places said adhesive surface face-to-face with itself.

18. A method of assembling a heat sealing wire article comprising the steps of:
  a) placing a high resistance electrical wire against the adhesive surface of an electrically insulating adhesive tape;
  b) folding the tape onto itself over the wire to provide a single ply portion encircling the wire and a double ply portion extending radially from the wire;
  c) inserting the double ply portion into a mounting bar slot; and
  d) securing the double ply portion in the slot.

19. A method as in claim 18 including bending the wire along its length to a desired curvature and inserting the double ply portion into a mounting bar slot formed to the desired curvature.

20. A method as in claim 19 wherein bending the wire along its length occurs after said folding step (b).

* * * * *